United States Patent
Borgonovo et al.

(10) Patent No.: US 10,151,833 B2
(45) Date of Patent: Dec. 11, 2018

(54) ACCELERATOR ENGINE, CORRESPONDING APPARATUS AND METHOD, FOR INSTANCE FOR ANTI-COLLISION SYSTEMS FOR MOTOR VEHICLES

(71) Applicant: STMICROELECTRONICS S.R.L., Agrate Brianza (IT)

(72) Inventors: Giampiero Borgonovo, Giussano (IT); Marco Montagnana, Cormano (IT)

(73) Assignee: STIMICROELECTRONICS S.R.L., Agrate Brianza (MB) (IT)

( * ) Notice: Subject to any disclaimer, the term of this patent is extended or adjusted under 35 U.S.C. 154(b) by 384 days.

(21) Appl. No.: 14/972,329

(22) Filed: Dec. 17, 2015

(65) Prior Publication Data

US 2016/0334512 A1 Nov. 17, 2016

(30) Foreign Application Priority Data

May 14, 2015 (IT) .............................. TO2015A0249

(51) Int. Cl.
*G01S 13/93* (2006.01)
*G01S 7/28* (2006.01)
(Continued)

(52) U.S. Cl.
CPC .......... *G01S 13/931* (2013.01); *G01S 7/2806* (2013.01); *G01S 7/2922* (2013.01); *G01S 7/2927* (2013.01);
(Continued)

(58) Field of Classification Search
CPC .......... G01S 7/354; G01S 13/34; G01S 7/411; G01S 13/003; G01S 13/42; G01S 13/726;
(Continued)

(56) References Cited

U.S. PATENT DOCUMENTS 5,293,330 A * 3/1994 Sayegh ................. G06F 17/142
708/406
5,416,488 A 5/1995 Grover et al.
(Continued)

FOREIGN PATENT DOCUMENTS

EP 1319960 6/2003
WO 2015059514 4/2015

OTHER PUBLICATIONS

Li Daojing; Yu Guilong, "2D-OS-CFAR detector for cloud clutter suppression," in Radar, 2001 CIE International Conference on, Proceedings , vol., No., pp. 350-353, 2001.
B. Magaz, A. Belouchrani, and M. Hamadouche, "Automatic threshold selection in OS-CFAR radar detection using information theoretic criteria", Progress in Electromagnetics Research B, vol. 30, pp. 157-175, 2011.

*Primary Examiner* — Olumide Ajibade Akonai
(74) *Attorney, Agent, or Firm* — Slater Matsil, LLP

(57) ABSTRACT

An accelerator device for use in generating a list of potential targets in a radar system, such as an anti-collision radar for a motor vehicle, may process radar data signals arranged in cells stored in a system memory. A cell under test in is identified as a potential target if the cell under test is a local peak over boundary cells and is higher than a certain threshold calculated by sorting range and velocity radar data signals arranged in windows. The cells identified as a potential target are sorted in a sorted list of potential targets. The accelerator device may include a double-buffering local memory for storing cell under test and boundary cell data; and a first and a second sorting unit for performing concurrent sorting of the radar data signals arranged in windows and the cells identified as a potential target in pipeline with accesses to the system memory.

24 Claims, 3 Drawing Sheets

(51) Int. Cl.
  *G01S 13/524* (2006.01)
  *G01S 7/292* (2006.01)
  *G01S 13/00* (2006.01)
  *G01S 7/35* (2006.01)
  *G01S 13/42* (2006.01)
  *G01S 13/02* (2006.01)

(52) U.S. Cl.
  CPC ........... *G01S 13/5246* (2013.01); *G01S 7/354* (2013.01); *G01S 13/003* (2013.01); *G01S 13/42* (2013.01); *G01S 2013/0245* (2013.01)

(58) Field of Classification Search
  CPC ...... G01S 2007/356; G01S 3/48; G01S 7/023; G01S 13/931; G01S 13/88; G01S 13/02; G01S 13/04; G01S 13/5246; G01S 13/0245; G01S 7/2922; G01S 7/2927
  See application file for complete search history.

(56) References Cited

U.S. PATENT DOCUMENTS

| | | | | |
|---|---|---|---|---|
| 5,499,030 | A | * | 3/1996 | Wicks ............... G01S 7/292 342/159 |
| 6,380,887 | B1 | | 4/2002 | Suen |
| 7,802,255 | B2 | | 9/2010 | Pilkington |
| 2010/0073218 | A1 | | 3/2010 | Stockmann |
| 2014/0253368 | A1 | * | 9/2014 | Holder ............... G01S 13/003 342/146 |
| 2014/0327566 | A1 | | 11/2014 | Burgio et al. |
| 2014/0375491 | A1 | * | 12/2014 | Roger ............... G01S 7/354 342/93 |
| 2015/0355319 | A1 | * | 12/2015 | Roger ............... G01S 13/42 342/147 |
| 2016/0282458 | A1 | * | 9/2016 | Nugraha ............... G01S 13/343 |

* cited by examiner

ACCELERATOR ENGINE, CORRESPONDING APPARATUS AND METHOD, FOR INSTANCE FOR ANTI-COLLISION SYSTEMS FOR MOTOR VEHICLES

FIELD OF THE INVENTION

The description relates to accelerator engines. One or more embodiments may be applied e.g. in obstacle detection and anti-collision systems for motor vehicles, such as motor cars.

BACKGROUND

Significant improvements in motor vehicle safety have derived and will expectedly derive in the future from the increased use of on-board radar systems and related data processing. Radar systems have been conceived as electromagnetic devices capable of detecting, locating and recognizing "target" objects, by transmitting electromagnetic signals and receiving back from these objects echoes which may be processed to identify location and/or other information.

In a radar receiver, the returning echoes received by an antenna (aerial) are amplified, down-converted and then passed through detector circuitry to extract e.g. the envelope of the signal (which may be referred to as the "video" or image signal). A video signal may be proportional to the strength (e.g. the power) of a received echo and may include, in addition to the desired echo signal, undesired power from internal receiver noise and external "clutter" and interference, which may degrade radar system performance significantly.

A good candidate for automotive safety is a Linear Frequency Modulated Continuous Wave (LFMCW) radar. This is a well understood and largely adopted radar concept which may provide the user with information about the target position (range and azimuth), velocity and amplitude. In various implementations, the basic LFMCW transmitted signal is a sequence of chirp waveforms centered at some specific frequency. A frequency considered for automotive applications may be e.g. 77 GHz.

Each chirp is a linear frequency modulated sine wave, with a modulation depth (o "bandwidth" BW) ranging e.g. from few MHz to several hundred MHz. The echo signal reflected back from the target may be mixed with the transmitted signal and an IF (Intermediate Frequency) signal generated. After e.g. amplification, band-limiting filtering and A/D conversion, the IF signal may be fed to a Digital Baseband processor where relevant information about the target behavior is extracted.

To ensure a correct censoring decision, the radar receiver may be designed to achieve a Constant False Alarm Rate (CFAR) and a maximum probability of detection. These points are particularly significant in safety applications in the automotive sector where the conventional designation "target" is indeed applied to persons (e.g. pedestrians) and objects (e.g. other vehicles, buildings, road fixtures) which are in fact intended to be avoided.

Various implementations of CFAR procedures are based on software approaches, mapped on powerful processors, e.g. based on an SIMD architecture. The complexity of certain processing procedures, combined with the speed constraints of radar systems for applications (with a short time between electromagnetic signal transmission and echo acquisition) aimed at detecting moving targets, may militate against the adoption of software approaches: CFAR procedures, such as e.g. Ordered Statistic CFAR (OS-CFAR), may be in fact be time absorbing, e.g. due to the amount of memory accesses, comparisons and concurrent sorting operations, in case of software implementation. These factors may end up by being an obstacle to the adoption of a radar-based system in the automotive sector, where cost may represent a significant factor.

SUMMARY

Improved arrangements which may address the drawbacks outlined in the foregoing would therefore be helpful.

One or more embodiments achieve that object thanks to a device (e.g. an accelerator engine) having the characteristics recited in the description that follows.

One or more embodiments may refer to corresponding apparatus (e.g. an anti-collision system for motor vehicles) including such an accelerator, as well as to a corresponding method.

One or more embodiments may rely on the concept of mapping on hardware accelerators certain complex procedures involved in Constant False Alarm Rate (CFAR) processing, with the aim of e.g. defining and setting a threshold in order to reliably distinguish valid targets from false targets.

One or more embodiments may offer advantages in terms of reduced data processing time (which makes it possible e.g. to adopt sophisticated procedures such as e.g. bi-dimensional CFAR) and improved performance in terms of cloud clutter suppression (e.g. in comparison with conventional mono-dimensional CFAR, as used in software-based solutions running on a standard DSP).

In one or more embodiments, a hardware accelerator engine may also offer a good level of scalability and flexibility, e.g. due to a variety of static and dynamic parameters which can be adapted to the characteristics and requirements of final applications.

BRIEF DESCRIPTION OF THE DRAWINGS

One or more embodiments will now be described, purely by way of non-limiting example, with reference to the annexed figures, wherein.

DETAILED DESCRIPTION

Figure 1:
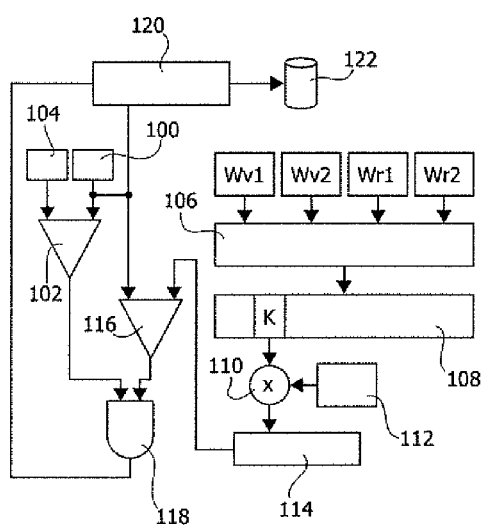
FIG. 1 is a schematic block diagram illustrative of a bi-dimensional CFAR procedure of the embodiments.

In the ensuing description one or more specific details are illustrated, aimed at providing an in-depth understanding of examples of embodiments. The embodiments may be obtained without one or more of the specific details, or with other methods, components, materials, etc. In other cases, known structures, materials, or operations are not illustrated or described in detail so that certain aspects of embodiments will not be obscured.

Reference to "an embodiment" or "one embodiment" in the framework of the present description is intended to indicate that a particular configuration, structure, or characteristic described in relation to the embodiment is comprised in at least one embodiment. Hence, phrases such as "in an embodiment" or "in one embodiment" that may be present in one or more points of the present description do not necessarily refer to one and the same embodiment. Moreover, particular conformations, structures, or characteristics may be combined in any adequate way in one or more embodiments.

The references used herein are provided merely for convenience, and, hence, do not define the scope of protection or the scope of the embodiments.

The following is a list of acronyms which may appear throughout this description along with a short explanation of the associated meanings.

LFMCW=Linear Frequency Modulated Continuous Wave
CFAR=constant false alarm rate
OS=ordered statistic
DSP=digital signal processing
CUT=cell under test
BN=boundary
WN=window
PK=peak
PT=pre-target
DMA=direct memory access
TM=threshold multiplier
FIFO=first-in first-out
FW=firmware Radar systems suitable to be considered for automotive safety applications may detect "targets" by comparing the return signal, with adaptive thresholds based e.g. on CFAR processing. Exemplary of such a system is the system disclosed e.g. in US2014/0327566 A1.

A variety of procedures may be used to process the received echo signal and provide effective target recognition. Software implementation of such procedures may become demanding in terms of computing load and time. Even when execution is mapped on powerful processors (e.g. based on Single Instruction/Multiple Data or SIMD architectures) performance of a radar system may be impaired, due to the "explosion" of processing time which may adversely affect the so-called scanning time (namely the time from echo acquisition to pre-target list definition), one of the key parameters in radar system performance. Conversely, resorting to simpler procedures might penalize the ability of the radar system to reliably distinguish valid targets over noise and interference from the environment.

A CFAR detector may set a threshold on a cell-by-cell basis according e.g. to an estimated noise/clutter power, which may be determined by processing a group of reference cells surrounding the cell under study.

A CFAR circuit may thus determine a power threshold above which any return can be considered—with good probability—to originate from a real target. If the threshold is low, then more targets will be detected at the expense of an increased numbers of false alarms. Conversely, if the threshold is high, then the number of false alarms will be low, but fewer targets will be detected. A threshold may then be set to achieve a certain probability of false alarms (or equivalently, certain false alarm rate or time between false alarms).

Various procedures for CFAR detection have been developed to cope with different situations and applications. For instance, for complex environments with non-homogeneous background and outlying returns (anti-collision radars for the automotive sector being an exemplary case) Ordered Statistic (OS) detectors may be effective. Furthermore, 2D OS-CFAR, an optimized variant of OS-CFAR can be adopted for high resolution systems, while maintaining the data processing load within reasonable terms.

The main tasks performed in a 2D OS-CFAR procedure may be summarized as follows: local maximum search in the spectrum (range, velocity, beam); sorting and selection (based on a K-order) of the window cells (range, velocity) for each local maximum, to compute a threshold value; peak identification corresponding to each local maximum higher than a computed threshold; and continuous sorting and selection of the highest N peaks per beam corresponding to a pre-target list.

Information concerning performance analysis of these procedures is provided, e.g. in: Li Daojing and Yu Guilong: "2D-OS-CFAR Detector for Cloud Clutter Suppression", Radar 2001 CIE International Conference on, Proceedings, pp. 350-353; and B. Magaz, A. Belouchrani, and M. Hamadouche: "Automatic threshold selection in OS-CFAR radar detection using information theoretic criteria", Progress in Electromagnetics Research B, Vol. 30, pages 157-175, 2011.

Figure 2:
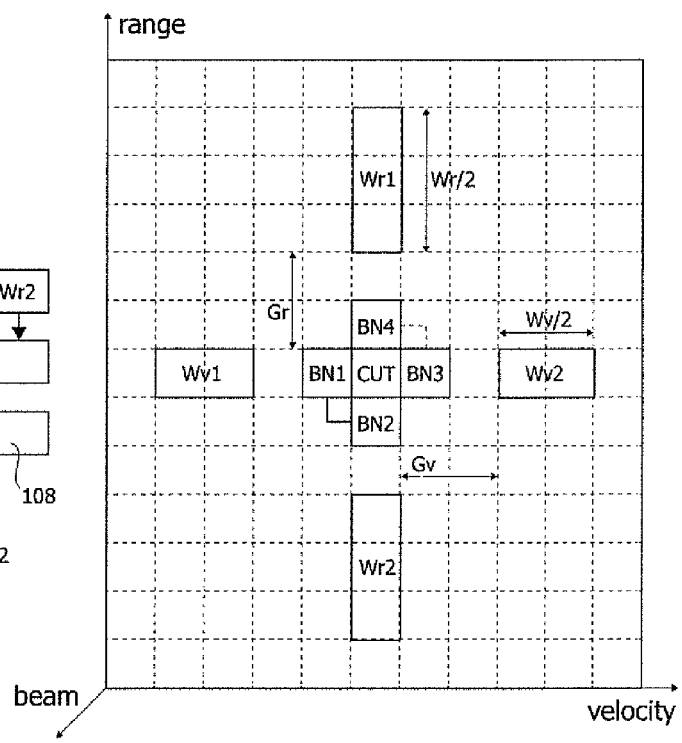
FIG. 2 is a graphical representation of exemplary processing in an arrangement as represented in FIG. 1.

A possible exemplary embodiment of a 2D OS-CFAR procedure is exemplified in FIGS. 1 and 2. There, a detected value for a cell under test or CUT (see also FIG. 2) as derived from a block 100 is provided to a comparator 102 for comparison with a boundary value BNx derived from a block 104 to ascertain whether the CUT is a local peak (maximum) by the comparison with the boundary cells (BN) e.g. in three directions (range, velocity, beam).

The block 106 in FIG. 1 is exemplary of sorting in a descending order, window (WN) cells e.g. in the form of Wv (e.g. Wv1, Wv2, . . . —the number of CFAR windows in the doppler direction) and Wr (e.g. Wr1, Wr2, . . . —the number of CFAR window cells in the range direction).

The block 108 is exemplary of window sorting (WN sorting) based on the K-order, where K denotes the rank of the OS-CFAR, and the outcome of processing at 108 is multiplied in a multiplier 110 with a threshold multiplier e.g. TM/32 derived from a block 112.

The result of multiplication at 110, namely a factor T=(TM/32)×Wsorted(K) represented by the block 114, is indicative of an adaptive threshold computed for the K cell and is sent to a comparator 116 for comparison with the value for the cell under test or CUT as derived from the block 100.

The outputs from the comparators 102 and 116 are combined in an AND gate 118 whose output indicates whether the cell under test (CUT) may represent a target candidate (e.g. target yes/no information).

Peak sorting (PK sorting) may then be applied at 120 to the output from the gate 118 and the result used to generate a pre-target list, PT list, 122.

In processing as exemplified in FIG. 1, qualifying a CUT cell in the data spectrum (e.g. range, velocity) as a potential pre-target (PK cell) is based on two conditions to be satisfied (jointly: see the AND operator 118): the comparison in comparator 102 indicates that the CUT cell (amplitude) as represented by the block 100 is a local peak (maximum) as a result of comparison with the boundary cells (EN) in three directions (range, velocity, beam); and the comparison in comparator 116 indicates that the CUT cell as represented by the block 100 in FIG. 1 is higher than T, the adaptive threshold T=(TM/32)×Wsorted(K).

FIG. 1 is schematic exemplary representation of the possibility for a cell K (according to the rank of the OS-CFAR) to be selected (element K) in the sorted list including the WN cells. Specifically, FIG. 2 shows that the WN cells (Wv and Wr) may be selected in the 2D spectrum (range, velocity) according to guard and window depth parameters Gr, Gv, Wr and Wv. This task is known as the single-step 2D OS-CFAR algorithm.

The pre-target list (list 122) may include the N highest (in terms of amplitude) peaks (PK cells) in the 2D spectrum (range, velocity) repeated for each beam, which comply with the two conditions referred to in the foregoing.

Processing as exemplified in FIGS. 1 and 2 is otherwise conventional per se, thus making it unnecessary to provide a more detailed disclosure herein.

Figure 3:
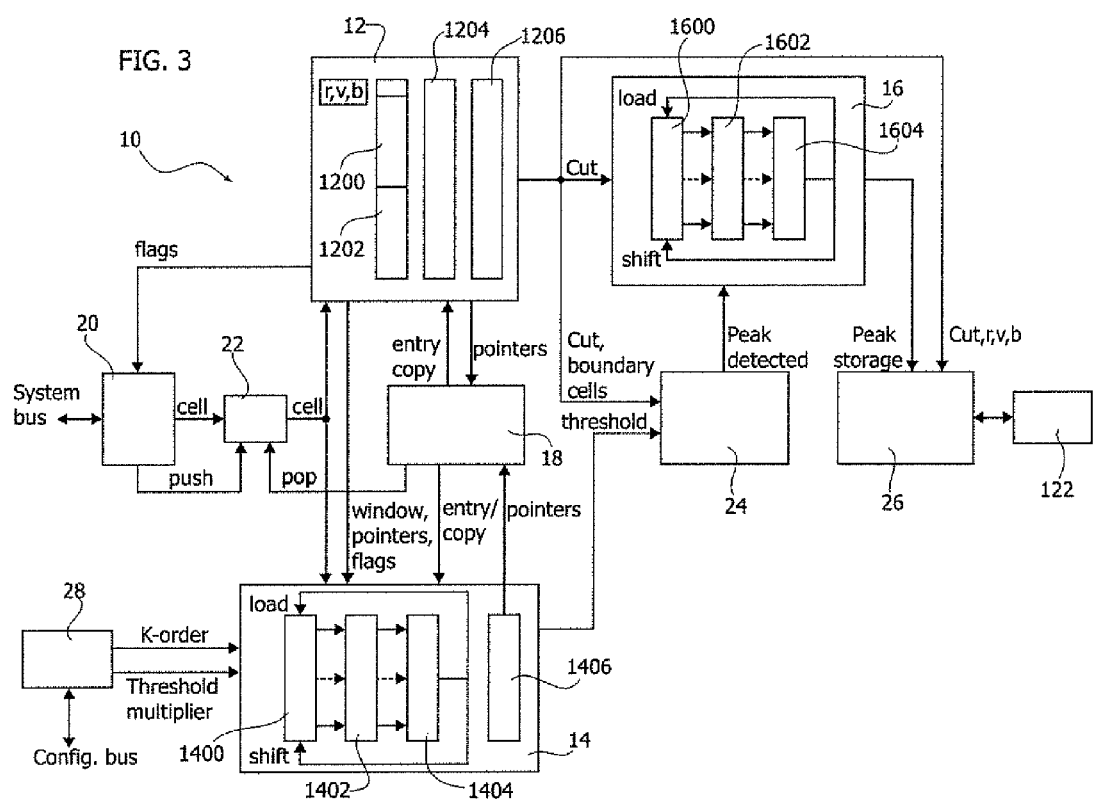
FIG. 3 is a schematic block diagram exemplary of embodiments.

The block diagram of FIG. 3 is representative of an exemplary hardware accelerator engine 10 which may reduce the time involved in performing the processing tasks considered in the foregoing in connection with FIGS. 1 and 2, independently of the data spectrum. In one or more embodiments, the processing time may essentially be a function of the number of memory accesses.

In one or more embodiments, to reduce the processing time (less than the number of memory accesses notionally involved in loading the required data), three core items may be included in the micro architecture of the accelerator 10, namely: an internal memory (e.g. pseudo-cache) 12 for the invariant BN, WN cells for re-using a sub-set of the BN, WN cells (pre-sorted) in the range or velocity direction depending on the scanning axis (range or velocity) of the system memory; two sorting units 14, 16 for performing concurrent sorting (WN cells and PK cells) in pipeline with the rest of the memory accesses and processing; and a control unit 18 that coordinates all the tasks in pipelined mode with back to back processing.

In one or more embodiments, the accelerator 10 may also include: a Direct Memory Access (DMA) unit 20 with an associated buffer 22 (e.g. FIFO) for spectrum data management e.g. in co-operation with a system bus (not visible in FIG. 3) and the local memory 12; an arithmetical unit 24 for performing tasks such as e.g. local max identification, threshold computation, peak detection, CUT skip detection (as detailed in the following) e.g. in cooperation with the sorting units 14, 16; a memory controller 26 for managing the pre-target list e.g. in terms of CUT cell insertion into the PKL memory 122 (see also FIG. 1) to store the set of pre-targets; and a set of registers 28 for interfacing the sorting unit 14 with a configuration bus (not visible in FIG. 3) e.g. for setting up the dynamic configuration of the accelerator.

An accelerator engine 10 as exemplified in FIG. 3 may support a set of static and dynamic parameters, which afford scalability and flexibility.

In one or more embodiments the memory (pseudo-cache) 12 may include (for each CUT and each of the directions, e.g. range, velocity and beam,—r, v, b) storage locations for boundary and window data 1200, 1202, pointers 1204 and flags 1206.

In one or more embodiments, input to the local memory 12 may include: cell identifier data provided from the FIFO 22 as in turn received from the DMA unit 20, and entry/copy commands from the control unit 18.

In one or more embodiments, output from the memory 12 may include: flags sent to the DMA unit 20; window, pointer and flag data to the sorting unit 14; pointers sent to the control unit 18; and CUT data sent to the sorting unit 16, the arithmetical unit 24 and the memory controller 26.

In one or more embodiments, the sorting unit 14 may include storing locations for a window table 1400, comparators 1402 and control circuitry 1404 providing shift and load commands for managing the window table 1400, as well as storage locations 1406 for window pointers.

In one or more embodiments, input to the sorting unit 14 may include: cell identifier data provided from the FIFO 22 as in turn received from the DMA unit 20; window, pointer and flag data from the memory 12; entry/copy commands from the control unit 18; and K-order and threshold multiplier data from the registers 28.

In one or more embodiments, output from the sorting unit 14 may include:
window pointers sent to the control unit 18,
threshold data sent to the arithmetical unit 24

In one or more embodiments the sorting unit 16 may include storing locations for a peak table 1600, comparators 1602 and control circuitry 1604 providing shift and load commands for managing the peak table 1600.

In one or more embodiments, input to the sorting unit 16 may include: CUT data from the memory 12; and peak detection information from the arithmetical unit 24.

In one or more embodiments, the output from the sorting unit 16 may include peak storage information sent to the PKL memory controller 26.

In one or more embodiments as exemplifies herein transfer of cell data from the DMA unit 20 to the buffer 22 and on to the memory 12 and the sorting unit 16 may take place based on push and pop commands sent to the buffer 22 by the DMA unit 20 and the control unit 18, respectively.

A single-step 2D OS-CFAR processing may qualify any single CUT cell as a potential pre-target according to the procedure discussed in connection with FIGS. 1 and 2.

In one or more embodiments, the time (TE_CFAR) for performing the steps of CFAR processing (i.e. data processing leading to updating the target list) may be reduced, notionally to the sole time for accessing data, insofar as the data processing time is "concealed" behind the time for accessing data due to the possible use of a pipelined processing architecture: this may be made possible by resorting to a double-buffering local memory 12 and the first and second sorting units 14, 16.

In one or more embodiments such a process may be re-iterated sequentially in the 2D data spectrum (range, velocity). Concurrent processes (each operating on a sub-set of beams) may be executed by resorting to a multi-core platform. In one or more embodiments, a hardware accelerator engine (micro)architecture 10 as shown in FIG. 3 may be provided for each core.

In one or more embodiments, the DMA unit 20 may upload from the system memory to the buffer 22 the data (e.g. CUT, BN, WN cells) involved in each step of the procedure.

In one or more embodiments, if the BN and WN cells are invariant from a previous single-step 2D OS-CFAR, uploading from the system memory may be avoided, thus leading to memory access optimization. To that effect, the DMA unit 20 may automatically "skip" reloading the invariant BN, WN cells according to the status information (flag) provided by the local memory 12.

In one or more embodiments, the time (TE_CFAR) for performing the steps of CFAR processing may be further reduced by re-using data already available in the local memory 12 from a previous step, by avoiding re-loading into the local memory 12 at least some data (e.g. CUT/BN, WNr, WNv data cells).

In one or more embodiments the (double-buffering) local memory 12 be configured for enabling re-using a pre-sorted sub-set of cell under test, boundary cell data and radar data signals arranged in windows in processing.

In one or more embodiments this may be facilitated by effective managing the contents of the local memory, e.g. as a function of the direction of scanning of data in the system memory.

It will be appreciated that the advantages outlined in the foregoing may be achieved irrespective of the contents of the data processed (that is e.g. irrespective of whether the cell under test (CUT) is a relative max value (peak) and/or is a pre-target value.

In one or more embodiments, the time (TE_CFAR) for performing the steps of CFAR processing may be still further reduced by implementing a so-called CUT skip detection feature, which may take advantage of the very nature of the data being processed.

For instance, in one or more embodiments, the accelerator device 10 may be configured, e.g. at the level of the arithmetic unit 24, to detect the occurrence of one of the following conditions: the cell under test is a local peak lower than each previous candidate (e.g. lower than the "worst" previous candidate) in a list of potential targets (pre-target list); and the cell under test is not a relative maximum (e.g. is not a local peak).

If any such condition is detected processing the (current) cell under test may be discontinued by "skipping" to processing a subsequent cell under test.

In one or more embodiments, the buffer unit 22 (e.g. FIFO) may provide a reduced buffer capability in order to avoid stall condition due e.g. to the latency of the system memory. It will be appreciated that a certain degree of latency can be tolerated, provided data processing is allowed to be executed back to back without wait states during the execution.

In one or more embodiments, the storage capability of the memory 12 may be dimensioned to store the data structure involved in processing a single-step 2D OS-CFAR. In one or more embodiments, the data information may include CUT, BN and WN cells. A double buffering scheme may facilitate back-to-back data processing of two consecutive steps of the 2D OS-CFAR procedure.

In one or more embodiments, the buffer unit 22 may be automatically switched by the control unit 18 in view of the subsequent memory upload (CUT, BN and WN cells) even if the pipelined tasks are yet to be completed on the current buffer.

In one or more embodiments, such status information may include pointers and flags, e.g. for use in tagging the BN and WN cells that can be re-used (already pre-sorted) for the next single-step CFAR processing without having to read anew the system memory.

In one or more embodiments, the sorting unit 14 may be configured for inserting an incoming WN cell in the sorted WN cell list 1400 within a single clock cycle. The associated engine may be based on a set of concurrent comparators e.g. 1402 with the control unit 1404 configured for loading and shift the WN cell list 1400 for any new entry.

In one or more embodiments, the sorting unit 16 may be configured for inserting a peak (PK) cell, qualified as potential pre-target, in the sorted PK list 1600, within a single clock cycle. The associated engine may be based on a set of concurrent comparators e.g. 1602 with the control unit 1604 configured for loading and shifting the PK cell list 1600 for any new entry.

One or more embodiments the 2D OS-CFAR processor (e.g. multi-core) architecture may be based on a replication of the HW accelerator engine 10 exemplified in FIG. 3.

Figure 4:
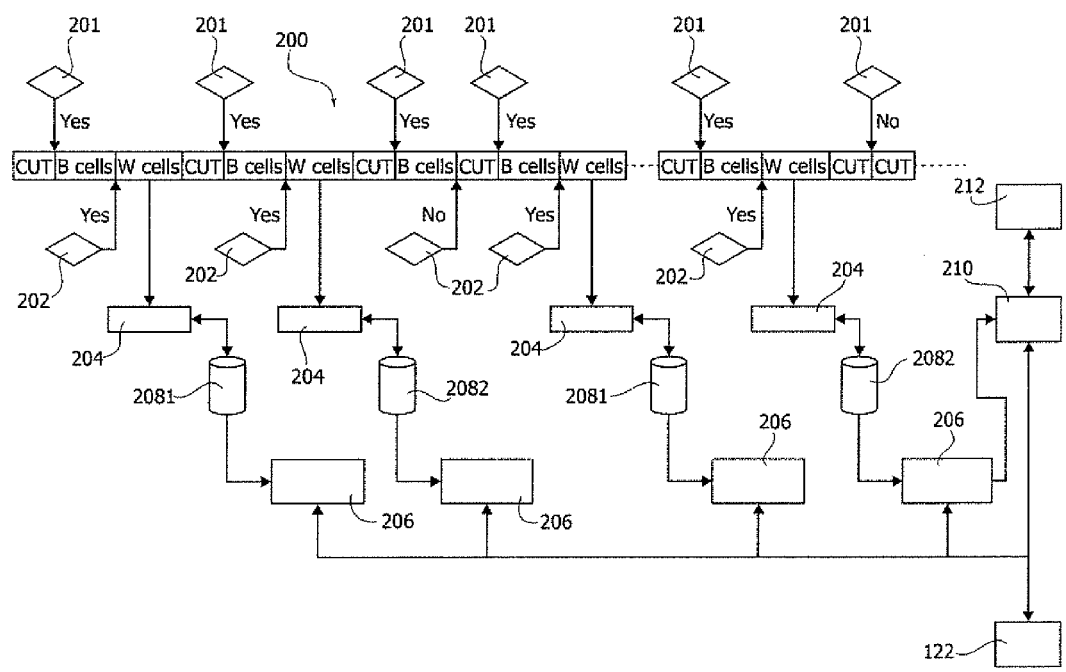
FIG. 4 is a diagram exemplary of possible flow control and data flow in embodiments.

In one or more embodiments, the main tasks supervised and coordinated by the control unit 24 may be as schematically illustrated in FIG. 4.

There, reference 200 indicates the sequence of uploading from the system memory into the local memory 12 the (e.g. double buffered) CUT, BN, WN cells involved in a single-step CFAR processing. In one or more embodiments, uploading may be executed back-to-back in order to minimize latency. In one or more embodiments, local maximum (CUT cell) evaluation may be performed in order to jump (optionally) to the next single-step CFAR processing.

The blocks 201 and 202 are representative of checks such as e.g.—CUT>pretarget list? (blocks 201)—and Local max? (blocks 202) which may be performed in order to detect the occurrence of one of the following conditions: the cell under test is a local peak lower than each previous candidate (e.g. lower than the "worst" previous candidate) in a list of potential targets (pre-target list); and the cell under test is not a relative maximum (e.g. is not a local peak).

As indicated, if any such condition is detected processing the (current) cell under test may be discontinued by "skipping" to processing a subsequent cell under test (CUT).

The blocks labeled 204 are representative of (pipelined) sorting of the WN cells, back-to-back with the incoming data. In one or more embodiments, the sorting task may be executed in the background (e.g. time-overlapped) with data spectrum uploading by the DMA unit 20.

The blocks labeled 206 are representative of threshold computation and peak evaluation for identifying a potential pre-target (PK cell), with sorting of the PK cells in order to build the peak list associated with each beam. In one or more embodiments, the sorting task may be executed in the background (time-overlapped) with data spectrum uploading by the DMA unit 20.

The blocks labeled 2081, 2082 are representative of data tables in the local memory 12 subject to processing in the blocks 204 and 206, with such first and second data tables possibly distinguished to highlight a double buffering mechanism and the ensuing timeline improvement in absorbing processing latency.

In one or more embodiments, pre-target generation (interpolation, data formatting) as schematically represented by the block 210 (and 212) may not be executed by the hardware accelerator 10, and may be implemented e.g. in firmware to feed the resulting data to the memory 122 e.g. as a pre-target list (for all the beams) sorted based on a key (range, velocity, amplitude).

Optionally, as a non-mandatory feature, one or more embodiments may include a (micro)programmable arithmetical-logical unit (ALU) 212 dedicated (e.g. at a FW level) to execute a pre-target generation task (e.g. result interpolation and formatting).

In one or more embodiments, parameters (static and dynamic) of an accelerator 10 as exemplified herein adapted to be configured according to the application may include e.g.: the number of concurrent cores (static parameter); the number of WN cells (Wr) in the range direction; the number of WN cells (Wv) in the velocity (Doppler) direction; the number of guard cells (Gr) in the range direction; the number of guard cells (Gv) in to velocity direction; K-order of the 2D OS-CFAR procedure; CFAR gain (threshold multiplier TM); and memory access optimization to reuse invariant WN, BN cells on each single-step 2D OS-CFAR processing (static parameter).

In one or more embodiments, the processing time may be equal to or less than the number of memory access cycles for uploading the 2D data spectrum (range, velocity) according to the layout of FIG. 1, independently of the content of the data spectrum, for configuration cases with no memory access optimization and with memory access optimization, respectively.

In one or more embodiments, the actual gain (in the order of 30%) may be a function of the configuration (e.g. number of WN cells).

In one or more embodiments, further improvements (depending on the content of the data spectrum) may be achieved if the CUT skip detection function (no local max or CUT amplitude lower than each item of the pre-target list) is applied by taking into account the side effects due to the latency (shared system memory and pipelined processing).

Without prejudice to the underlying principles, the details and embodiments may vary, even significantly, with respect to what is illustrated herein purely by way of non-limiting example, without thereby departing from the extent of protection.

The extent of protection is determined by the claims that follow.

That which is claimed:

1. An accelerator device for use in generating a list of potential targets in a radar system by processing radar data signals arranged in cells stored in a system memory, wherein a cell under test in the radar signals is identified as a potential target if the cell under test is a local peak over boundary cells and is higher than a certain threshold calculated by sorting range and velocity radar data signals arranged in windows, and the cells identified as a potential target are sorted in a sorted list of potential targets, wherein the accelerator device comprises:
    a double-buffering local memory configured to store cell under test and boundary cell data; and
    a first and a second sorting unit configured to concurrently sort the radar data signals arranged in windows and the cells identified as a potential target in a pipeline with access to the system memory, wherein the double-buffering local memory is configured to enable re-using a pre-sorted sub-set of the cell under test, boundary cell data and radar data signals arranged in windows as a function of a direction of scanning the data in the system memory.

2. The accelerator device of claim 1, comprising a control unit configured to coordinate operation of the local memory and the first and second sorting units in a pipelined mode.

3. The accelerator device of claim 1, comprising a control unit configured to coordinate operation of the local memory and the first and second sorting units in a pipelined mode with back-to-back processing.

4. The accelerator device of claim 1, comprising a direct memory access unit configured to manage data in co-operation with the system memory and the local memory.

5. The accelerator device of claim 1, comprising a buffer associated with the direct memory access.

6. The accelerator device of claim 4, wherein the direct memory access unit is configured to skip uploading data from the system memory if the cell under test, boundary cell data and radar data signals arranged in windows are invariant from a previous processing step based on status information provided by the local memory.

7. The accelerator device of claim 1, wherein the first sorting unit is configured to insert an incoming cell of the radar data signals arranged in windows in a sorted cell list within a single clock cycle.

8. The accelerator device of claim 1, wherein the second sorting unit is configured to insert a new potential target in the sorted list of potential targets within a single clock cycle.

9. The accelerator device of claim 1, comprising an arithmetical unit configured to perform in cooperation with the first and second sorting units processing tasks selected out of local maximum identification, threshold computation, and peak detection.

10. The accelerator device of claim 1, comprising a memory controller configured to manage the sorted list of potential targets.

11. The accelerator device of claim 1, wherein the accelerator device is configured to:
    detect at least one of a) the cell under test being a local peak lower than each previous candidate in a list of potential targets, and b) the cell under test not being a local peak; and
    discontinue processing the cell under test for which a) or b) are detected and skipping to processing a subsequent cell under test.

12. An apparatus comprising:
    a system memory; and
    an accelerator device configured to generate a list of potential targets in a radar system by processing radar data signals arranged in cells stored in the system memory, wherein a cell under test in the radar signals is identified as a potential target if the cell under test is a local peak over boundary cells and is higher than a certain threshold calculated by sorting range and velocity radar data signals arranged in windows, and the cells identified as a potential target are sorted in a sorted list of potential
    targets, wherein the accelerator device comprises:
    a double-buffering local memory configured to store cell under test and boundary cell data, and
    a first and a second sorting unit configured to concurrently sort the radar data signals arranged in windows and the cells identified as a potential target in a pipeline with access to the system memory, wherein the double-buffering local memory is configured to enable re-using a pre-sorted sub-set of the cell under test, boundary cell data and radar data signals arranged in windows as a function of a direction of scanning the data in the system memory.

13. The apparatus of claim 12, comprising a control unit configured to coordinate operation of the local memory and the first and second sorting units in a pipelined mode.

14. The apparatus of claim 12, comprising a direct memory access unit configured to manage data in co-operation with the system memory and the local memory.

15. The apparatus of claim 14, wherein the direct memory access unit is configured to skip uploading data from the system memory if the cell under test, boundary cell data and radar data signals arranged in windows are invariant from a previous processing step based on status information provided by the local memory.

16. The apparatus of claim 12, wherein the first sorting unit is configured to insert an incoming cell of the radar data signals arranged in windows in a sorted cell list within a single clock cycle.

17. The apparatus of claim 12, wherein the second sorting unit is configured to insert a new potential target in the sorted list of potential targets within a single clock cycle.

18. The apparatus of claim 12, comprising an arithmetical unit configured to perform in cooperation with the first and second sorting units processing tasks selected out of local maximum identification, threshold computation, and peak detection.

19. The apparatus of claim 12, comprising a memory controller configured to manage the sorted list of potential targets.

20. The apparatus of claim 12, wherein the accelerator device is configured to:
    detect at least one of a) the cell under test being a local peak lower than each previous candidate in a list of potential targets, and b) the cell under test not being a local peak; and
    discontinue processing the cell under test for which a) or b) are detected and skipping to processing a subsequent cell under test.

21. The apparatus of claim 12, wherein the system memory and accelerator are configured to define a radar apparatus.

22. The apparatus of claim 21, wherein the radar apparatus comprises an anti-collision radar for a motor vehicle.

23. A method comprising:
    operating an accelerator device to generate a list of potential targets in a radar system by processing radar data signals arranged in cells stored in a system memory, wherein a cell under test in the radar signals is identified as a potential target if the cell under test is a local peak over boundary cells and is higher than a certain threshold calculated by sorting range and velocity radar data signals arranged in windows, and the cells identified as a potential target are sorted in a sorted list of potential
    targets, wherein the accelerator device comprises:
    a double-buffering local memory storing cell under test and boundary cell data, and
    a first and a second sorting unit concurrently sorting the radar data signals arranged in windows and the cells identified as a potential target in a pipeline with access to the system memory, wherein the double-buffering local memory is configured to enable re-using a pre-sorted sub-set of the cell under test, boundary cell data and radar data signals arranged in windows as a function of a direction of scanning the data in the system memory.

24. The method of claim 23, wherein the radar data is for an anti-collision radar for a motor vehicle.

* * * * *

UNITED STATES PATENT AND TRADEMARK OFFICE
CERTIFICATE OF CORRECTION

PATENT NO. : 10,151,833 B2
APPLICATION NO. : 14/972329
DATED : December 11, 2018
INVENTOR(S) : Borgonovo et al.

Page 1 of 1

It is certified that error appears in the above-identified patent and that said Letters Patent is hereby corrected as shown below:

On the Title Page

Item (73) Assignee, Line 1, delete "STIMICROELECTRONICS S.R.L." and insert --STMICROELECTRONICS S.R.L.--.

Signed and Sealed this
Twelfth Day of March, 2019

Andrei Iancu
*Director of the United States Patent and Trademark Office*